United States Patent [19]
Hanson

[11] Patent Number: 5,257,346
[45] Date of Patent: Oct. 26, 1993

[54] WIRE-MESH GENERATION FROM IMAGE DATA

[75] Inventor: William A. Hanson, Mountain View, Calif.

[73] Assignee: International Business Machines Corporation, Armonk, N.Y.

[21] Appl. No.: 587,312

[22] Filed: Sep. 24, 1990

[51] Int. Cl.⁵ .............................................. G06F 15/72
[52] U.S. Cl. ................................................ 395/125
[58] Field of Search ............. 395/119, 120, 123, 124, 395/125; 364/560, 564; 382/1, 22

[56] References Cited

U.S. PATENT DOCUMENTS

| | | | |
|---|---|---|---|
| 4,710,876 | 6/1987 | Cline et al. | 364/414 |
| 4,831,528 | 11/1987 | Crawford et al. | 364/413.22 |
| 4,719,585 | 6/1988 | Cline et al. | 364/518 |
| 4,797,842 | 1/1989 | Nackman et al. | 364/578 |
| 4,879,668 | 11/1989 | Cline et al. | 364/522 |

*Primary Examiner*—Mark K. Zimmerman
*Attorney, Agent, or Firm*—L. Keith Stephens; G. Marlin Knight

[57] ABSTRACT

A method and apparatus for obtaining well defined surface descriptions from a three-dimensional image. The invention employs an imaging and graphic system to receive as input an image and initial surface of points. The surface of points are modified in the memory of the graphic system to conform to the surface they represent by continually shrinking the points until they conform precisely to the surface to be matched. The resulting set of vectors are displayed by the graphic system. The integrated graphics and imaging system provides remarkable improvements in representing the surface.

16 Claims, 3 Drawing Sheets

WIRE-MESH GENERATION FROM IMAGE DATA

FIELD OF THE INVENTION

This invention generally relates to improvements in a computer graphic systems and more particularly to a technique that enhances a representation of image data in a graphic display system.

DESCRIPTION OF THE INVENTION

The invention converts three-dimensional image volumetric raster data set into graphic vector sets of selectable surfaces Raster data sets (images) consist of a three-dimensional array of numbers. For example, numbers indicative of intensity at each x, y coordinate on the display. Graphic data set (vectors) consist of a list of point locations and command lists indicating how the points are connected.

Three-dimensional raster to vector conversion is important to utilize the large variety of engineering analysis tools designed for wire mesh or engineering models, and to exploit the high speed graphic processors in presenting three-dimensional information visually. This facilitates utilization of engineering models and interactive engineering tools for visualization.

Current conversion tools exist for converting three-dimensional volumetric data into three-dimensional visual renderings based on perspective viewing, optical parameters of the contents, textual properties, and lighting models. These methods are directed towards perceptual quality (photo-realistic) renderings of the three-dimensional data. These techniques do not lend themselves to engineering modeling and analysis In addition, these techniques tend to be computationally intensive making interactive processing virtually impossible.

A classic method for generating three-dimensional vector versions of raster data is based on contouring individual planes of the data. Ad-hoc techniques are then applied to connect the contours from adjacent planes.

In the Computer Aided Design/Computer Aided Manufacturing (CAD/CAM) arena, methods exist for generating surface meshes for ideal geometric objects such as circles, triangles, squares, etc. and to some extent, three-dimensional objects such as spheres, cubes, and tetrahedrons. These methods do not lend themselves to arbitrary, real world objects that arise when dealing with sensory data.

Present image processing techniques for display on a graphic system are unable to match the original image with the precision that the invention provides Examples of various methods for converting image data into graphic representations are found in U.S. Pat. Nos. 4,879,668; 4,831,528; 4,710,876; and 4,719,585.

This invention is a method and apparatus to obtain well defined surface descriptions from a three-dimensional image or field data. A surface of points is modified to conform to the surface by continually refining the points until they conform precisely to the surface to be matched. The resulting set of vectors provide remarkable improvements in representing the surface to be modelled over existing methods.

For example, in medical imaging, it is often necessary to create a wire-frame model for three-dimensional modeling of the surface of a person's anatomy, say a person's face. For reconstructive surgery, it is imperative that the model is precise. Employing the invention, a Doctor can obtain a wire mesh that most closely approximates a piece of cellophane stretched to precisely match the patient's facial features By creating a highly accurate, wire-mesh representation, current medical imaging applications, Magnetic Resonant Imaging (MRI) techniques, CAT Scans and existing CAD/CAM analysis routines can be more effectively exploited.

SUMMARY OF THE INVENTION

An integrated graphic and image system for generating a wire-mesh representation of graphic information representative of a three dimensional surface in image data is disclosed. The system includes a disk drive for storing graphic information representative of a three dimensional surface. The system also has a memory and central processing unit (CPU) for generating data representative of an initial wire-mesh comprising a set of points in three dimensional space and a topology. The CPU further refines the initial wire-mesh representation by modifying the initial wire-mesh to intersect the graphic information representative of the original three dimensional surface at specific points. The CPU generates a new wire-mesh by clamping the intersecting points to the image information representative of a three dimensional surface to further refine the wire mesh representation. The CPU repeats the refining steps until every point of the initial wire-mesh is clamped to form a wire-mesh representation of the three dimensional surface.

DETAILED DESCRIPTION OF THE INVENTION

Figure 1:
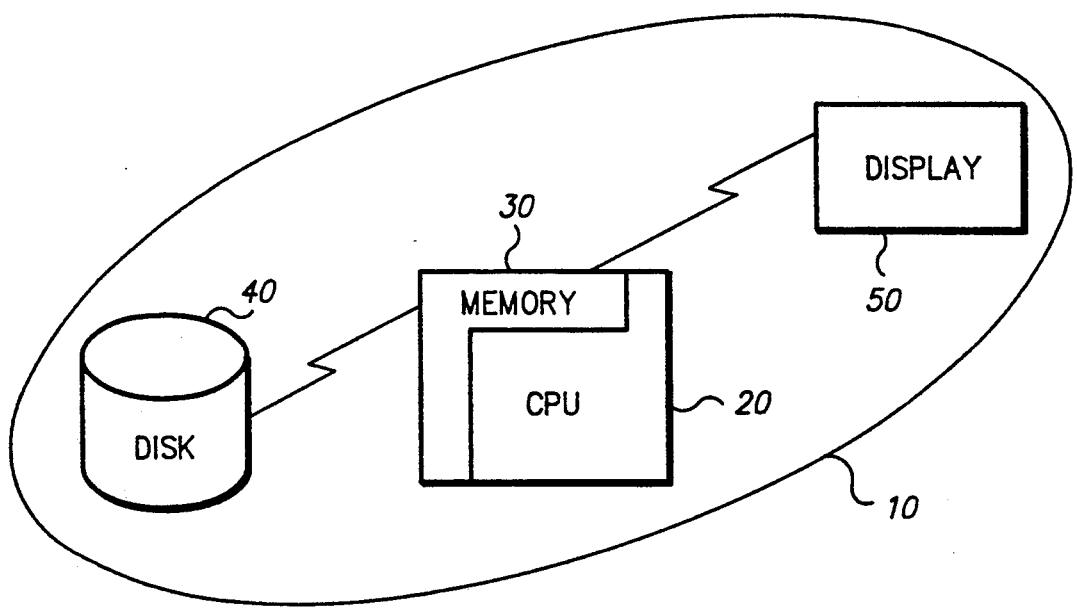
FIG. 1 is a block diagram of a computer graphic system in accordance with the present invention.

Referring first to FIG. 1 of the drawings, there is shown a block diagram of a computer system employing the invention. The logic represented in the flowcharts (FIG. 2) resides in the memory 30 of the graphic system 10. A CPU 20 communicates with the memory 30 and executes the instructions attached below in the listing of the program in accordance with the present invention. Various other units can be connected to the CPU 20 in addition to the graphic display 50 and the disk 40.

Figure 2:
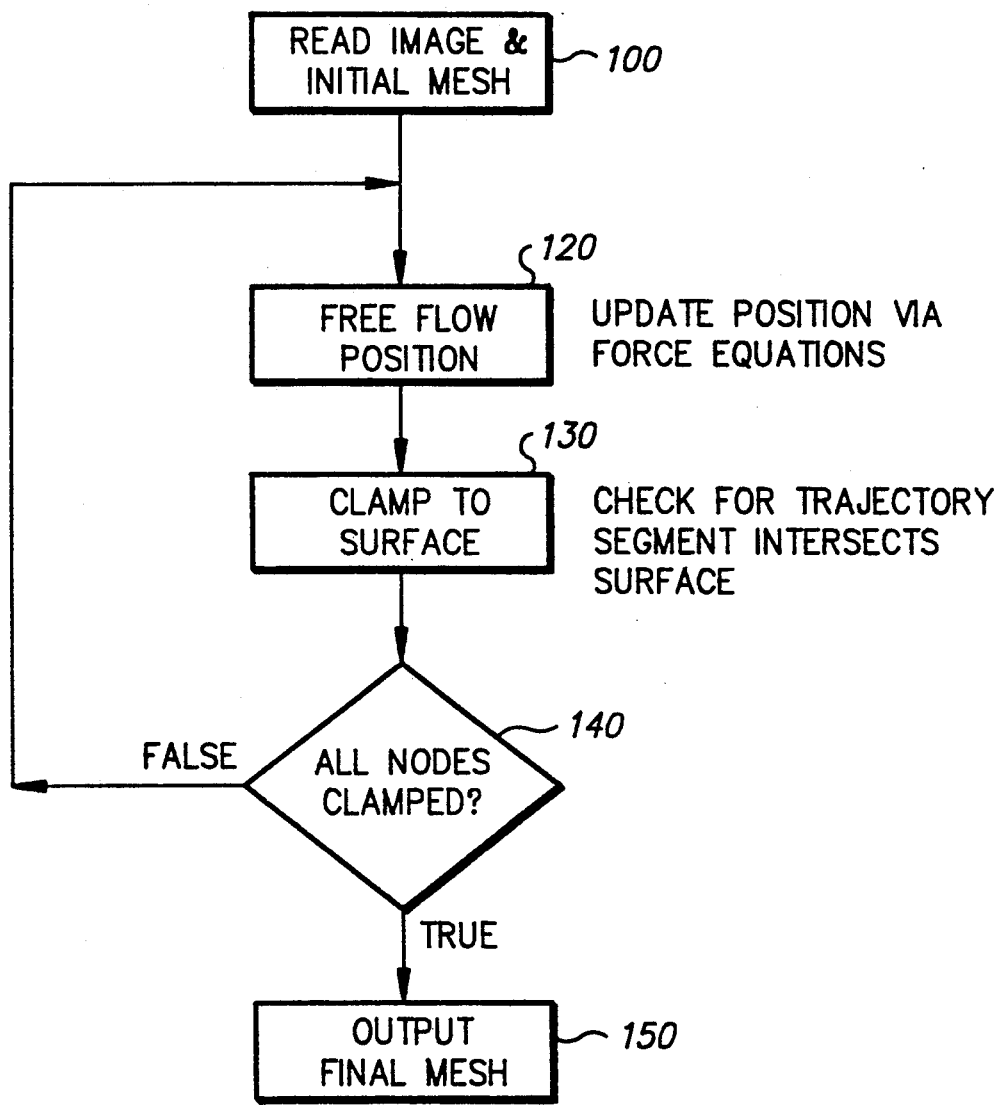
FIG. 2 is a flow chart in accordance with the present invention.
Figure 3:
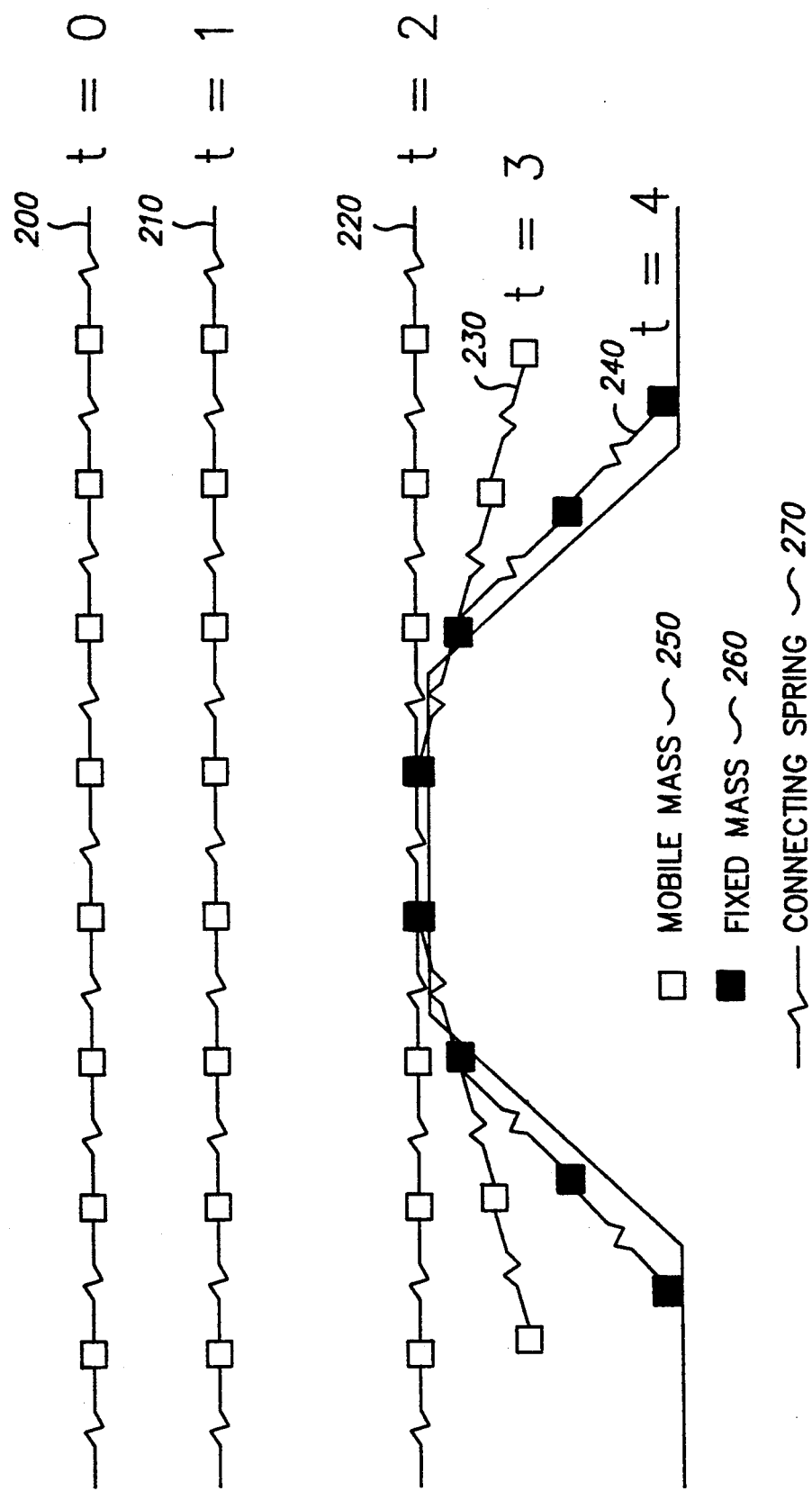
FIG. 3 is a time diagram in accordance with the present invention.

In practice, the program is loaded from the disk 40 and reads the image data and generates the initial mesh as depicted in function block 100 of FIG. 2. The initial mesh is generated as a surface as shown at time zero in FIG. 3 at label 200 on the graphic display 50. The initial mesh is composed of mobile masses 250 connected by connecting springs 270. The mobile masses and connecting springs are represented in the memory of the graphic system by mathematical equations predetermined by the user based on the characteristics of the surface to be represented.

An embodiment of the invention currently resides on an IBM 3090 computer. The display is an IBM 6090 (or 5080) graphic workstation. The computer system comprises a keyboard, display, memory, disk and S/370 processor. The graphic workstation comprises a local memory, display and various input devices. The input devices include a keyboard, tracking cursor with tablet, dials and a multi-function keypad. IBM's graPHIGS software is used to create the images and refine the surfaces in accordance with the present invention and the program listing which appears below.

Various examples of effective equations are discussed below as examples utilized currently. However, the invention is not dependent on the use of any particular equation. After initiation, the initial mesh is moved into intersection with the surface to be represented, depicted as a hump at the base of FIG. 3 at label 240. The mobile masses 250 become fixed masses 260 at the points of intersection with the surface as depicted at time=two 220 of FIG. 3. The actual positions of the masses and their points of intersection are updated dynamically on the display as the initial mesh is moved into place as shown in function block 120 of FIG. 2. However, the mobile mass 250 is not transformed into a fixed mass 260 until a trajectory segment intersects the surface to be matched. A trajectory segment refers to the segment between two mobile masses.

The refinement of the initial mesh by moving it into more and more of a one-to-one correspondence with the surface to be matched continues until all of the mobile masses have been transformed into fixed masses as represented in decision block 140. When the final mesh is complete, it is displayed on the display 50 and written to disk 40 as shown in function block 150.

The apparatus and method discussed above processes three-dimensional volumetric raster data and produces a graphic vector data set. This output graphic vector data set is a set of three-dimensional points and associated connectivity between those points that produce a wire mesh rendering of a selected surface in the three-dimensional raster data. The volumetric data sets can be arbitrarily complex—no simple geometric object decomposition is assumed.

The three-dimensional points and the associated connectivity is referred to as a geodesic.

$$G = \{P^i, T^i\} i = 1, N$$

$P^i = (x^i, y^i, z^i)$ = vector data set of node points on surface $x^i$ = x coordinate of point i
$y^i$ = y coordinate of point i
$z^i$ = z coordinate of point i
$T^i$ = topology list = list of neighbor nodes for node i Given a three-dimensional multicolored image, we seek to find a geodesic representation of surfaces in the image. Let $I_{xyz}$ = source image of colors located in three-dimensional space.

In this case, a surface in the image means an exterior boundary for which the color (or intensity) is a constant:

$$G = \{P^i, T^i\}$$

$I_p = I^O$ = a given threshold constant

Note that the geodesic format can easily be converted to other wire mesh specifications such as facets models or simple move/draw command lists. The derivation given here is based on the above format; conversions to other forms is self evident. The simplest wire mesh rendering is to draw line segments between every point and all of its neighbors:

∀i draw line from $P^i$ to $P^j$ where $j \epsilon T^i$

The algorithm emulates a "shrink wrap" process by simulating the contraction of an elastic geodesic. The simulation is performed by mathematically modelling a hypothetical elastic membrane undergoing a collapse due to internal suction or from surface tension. Variations of the basic method allow for different dynamic models for the collapse, different physical parameters for the elastic nature, and different initial conditions for the starting mesh.

SHRINK WRAP

The method and apparatus contract a given geodesic to the image surface. The contraction is performed via a time simulation. Assume we are given an initial geodesic consisting of node locations and an associated topology:

$$G(t=0) = \{P^i, T^i\}$$

where t=time

The initial selection of the geodesic is a system input. For clarity, assume for now a longitude/latitude type grid with equal angular spacing. The points (P) are then the three-dimensional locations of the grid intersections and the topology (T) for each point refers to each of the four neighbors (above, below, left, and right). Without loss of generality, assume that the image lies entirely within starting geodesic set (if not, simply magnify the geodesic by the size of the image).

The output geodesic is computed by assigning physical parameters to each of the nodes and topology links and then allowing the resulting physical system to transition to equilibrium. This physical model is what is commonly known as a lumped parameter system. Each node is assigned a mass and a model of the forces is established for each of the topology links.

Topology link forces can be extremely simple (e.g. free fall), linear (e.g. Hooke's law for springs) or non-linear (e.g. terminal velocity) all of which are described in more detail below. Whatever physical model is selected, the initial geodesic is collapsed onto the surface by simulating the Newtonian physical model based on position P(t), velocity $\dot{P}(t)$, and acceleration $\ddot{P}(t)$. (Super "dot" denoting time derivative.)

$$M^i \ddot{p}^i(t) = \text{inertial force}$$
$$= \Sigma \text{ all forces acting on node } i$$
$$= F^i(t)$$

The time simulation is performed by numerical integration; the simplest means being to use Eulers method although other techniques are equally applicable (such as Runge-Kutta). Eulers method for a given δt becomes:

$$G(t-1) \rightarrow G(t)$$

$$\ddot{P}^i(t) = \frac{F^i}{M^i}(t)$$

$$\dot{P}^i(t) = \dot{P}^i(t-1) + t\ddot{P}^i(t)$$

$$P^i(t) = P^i(t-1) + t\dot{P}^i(t)$$

At each time update, a check is made to determine if the trajectory from $P^i(t-1)$ to $P^i(t)$ intersects the surface of interest. This test is performed by testing the intensities at all unique image locations along the trajectory and determining if and when the intensity profile crosses a given threshold. Resampling the image data at trajectory positions is performed using any of the standard methods (e.g. nearest neighbor, tri-linear interpolation, etc.). If the threshold is crossed (i.e. if the trajectory intersects the surface) then the associated node position is set to the surface location. In addition, the mass associated with that node is set to infinity. This has the effect of fixing that particular point to the surface and no further motion of that node will occur.

if $[P^i(t-1), P^i(t)]$ intersects surface
$P^i(t) =$ surface point
$M^i = \infty$ (In actual implementation, rather than setting the mass to infinity, the node is simply tagged as being fixed and the position and velocity updates are no longer performed.)

The time integration proceeds iteratively until all motion has ceased or until the total kinetic energy has decreased below a threshold. The desired geodesic is given by the steady state (static equilibrium) result:

$$G(\text{steady state}) = G(t \to \infty)$$
$$= \{P^i(t \to \infty), T\}^i$$

Static equilibrium can occur when all points have in fact collapsed onto the surface or when the geodesic has been stretched across open regions. Points that are not on the surface can be pruned out from the geodesic simply by deleting the point and all references to that point in the topology list.

Static equilibrium will occur provided there are dissipative forces and that the external forces are designed to drive the system to a fixed point.

SPECIFIC MODELS

For completeness, specific physical models are now presented. The pros and cons of the models are subjective and case dependent. In fact, a whole plethora of physical models exist to model different types of elastic material in a variety of environments. The method presented proceeds using numerical integration of the system state which easily encompasses any physical model of the general form:

$$F^i(t) = f(P^i(t-k), \dot{P}^i(t-k), \ddot{P}^i(t-k), t) \; 0 < k \leq t$$

SPECIFIC MODEL: FREE FALL (FF)

In this model, FF, topology link forces are non-existent. An internal suction (vacuum) force is applied. This force is such to draw all node points towards a common origin. In addition, a dissipative friction force is applied to force the system to converge. In this case, the shrink wrap method reduces to projecting rays from each of the initial geodesic locations into the image and determining the resulting position. For given constants $F_0$ and $b^i$, $$F^i(t) = -F_0 P^i(t-1) - b^i \dot{P}^i(t-1)$$

SPECIFIC MODEL: LINEAR LUMPED PARAMETER (LLP)

The LLP model assumes an elastic model based on idealized linear springs (Hooke's law) and a dissipative energy proportional to the velocity. Each link is assigned a spring constant ($K^{ij}$) and each point is assigned a frictional constant ($b^i$).

$$F^i(t) = - \sum_{j \in T^i} K^{ij}(P^i(t-1) - P^j(t-1)) - b^i \dot{P}^i(t-1)$$

MODEL VARIATION: TERMINAL VELOCITY

Both of the above models can be varied by altering the dynamic model. One such variation is to hard limit the velocity giving FF-TV and LLP-TV models. Thus, the acceleration and position updates are as before but the velocity equation becomes:

$$\dot{P}^i(t) = \dot{P}^i(t-1) + \delta t \ddot{P}^i(t)$$

$$\dot{P}^i(t) = \min(|\dot{P}^i(t)|, \dot{P}_{max}) \frac{\dot{P}^i(t)}{|\dot{P}^i(t)|}$$

OTHER MODELS

Non-linear extensions to Hooke's law and other non-linear versions of frictional dissipative forces are easily incorporated into the scheme. The above models described above disclose techniques that varied the physical model and parameterization resulting in different state trajectories on P. Another variation that the proposed technique allows is to dynamically alter the topology. For example, elastic breaking can be simulated by deleting neighbors of a node. Thus, at each time step, for a given break threshold $d_{break}$, $$i \quad j \in T^i$$

if $|P^i - P^j| > d_{break}$ delete $j$ from $T^i$

INITIAL GEODESIC

The initial geodesic is a predefined surface initially set at system definition. The accuracy of the resulting geodesic is directly correlated to the surface chosen for the starting geodesic. Factors that yield favorable results on actual objects are presented.

1) In general, initial geodesics should correspond to the gross approximate shape of the object.
2) A spherical longitude/latitude grid with uniform angular increments generates excellent representations for medical data of a human skull.
3) A cylindrical grid with uniform angular increments and uniform spatial increments along the z axis was found to generate excellent representations for certain industrial parts.
4) Non-uniform Rational B-Splines (NURBS) are a well known surface representation technique that can be exploited by selecting a NURB surface as the initial geodesic of the designers choice.

Non-Uniform Rational B-Splines (NURBS) are used in one embodiment to describe all large complex surfaces mathematically. As described in IBM's AIX Personal graPHIGS Programming Interface/6000 Version 2, copyright Jan. 29, 1990, NURBS are supported by IBM in their graphic programming language. NURBS and the subsequent productivity boost incorporated by their use is described in the October 1989 Computer Graphics REVIEW on pages 22 to 26. NURBS support complex mathematical definition of surfaces in a single data structure.

The NURB processing manipulates a set of three-dimensional control points arranged on an ordered two-dimensional grid. In accordance with the subject invention, the ordered two-dimensional grid specifies the topology of the geodesic while the three-dimensional points are the nodes. The resulting geodesic is a NURB surface whereby all of the control points (nodes) lie on the actual surface. Further, the topology remains unchanged. Thus, the resulting geodesic is a NURB representation of the image object that corresponds very closely to the original image.

A computer program listing in accordance with the invention is found in the Appendix.

APPENDIX

```
@PROCESS DIRECTIVE('*VDIR:') DC(CNODES,CLINKS,CIMAGE)
C*******************************************************************
C                                                               
C** FILE: SWLUMP                                                  **
C** PACKAGE: Shrink Wrap                                          **
C**                                                               **
C** Function: Shrink wrap using lumped parameter model            **
C**                                                               **
C** Revision:                                                     **
C**                                                               **
C*******************************************************************
C**       Written by William A. Hanson, 1988                      **
C**       Copyright (C) IBM Corporation, 1988.                    **
C*******************************************************************
      PROGRAM SWLUMP
      &INCLUDE SYSTEM/SYSTEM
      &INCLUDE GRPHIGS/GRPHIGS
C*
      PARAMETER ( NSMOVE = 0 )  ! NSTAT: node mobile
      PARAMETER ( NSFIXD = 1 )  !        node fixed to surface
      PARAMETER ( LNODE = 65536 )
      COMMON /CNODES/ NNODE,NSTAT,
     X                MASS,FRICT,
     X                P,V,F
      INTEGER*4 NSTAT(0:LNODE)
      REAL*4    MASS(0:LNODE)
      REAL*4    FRICT(0:LNODE)
      REAL*4    P(3,0:LNODE),V(3,0:LNODE),F(3,0:LNODE)
C*
      PARAMETER ( LSNORM = 0 )  ! LSTAT: normal
      PARAMETER ( LSBROK = 1 )  !        broken
      PARAMETER ( LLINK = 16*LNODE )
      COMMON /CLINKS/ NLINK,LSTAT,SPRING,
     X                END1,END2
```

```fortran
      INTEGER*4 LSTAT(0:LLINK)
      REAL*4    SPRING(0:LLINK)
      INTEGER*4 END1(0:LLINK),END2(0:LLINK)
C*
      PARAMETER ( LDIM = 256 )
      PARAMETER ( LPIXEL = LDIM*LDIM*LDIM )
      COMMON /CIMAGE/ IMAGE
      CHARACTER*1 IMAGE(LPIXEL)
      REAL*4   RAY(0:8*LDIM)
C*
      CHARACTER*8  IFN,IFT,IFM
      CHARACTER*8  NFN,NFT,NFM
      CHARACTER*8  LFN,LFT,LFM
      INTEGER*4    ILUN(15),NLUN(15),LLUN(15)
C*
      INTEGER*4  ADIM(3),NCOL,NROW,NPLN
      EQUIVALENCE (ADIM(1),NCOL), (ADIM(2),NROW), (ADIM(3),NPLN)
      REAL*4     AUNIT(3),ASIZE(3),ARES
      REAL*4     NUNIT(3),NSIZE(3),NRES
C*
      REAL*4     DP(3),P0(3),PP(3)
      REAL*8     KE,PE,AR
      REAL*4     CLUTS(3,0:127)
      INTEGER*4  OPMODE
      LOGICAL*4  DEBUG
C**
C*******************************************************************
C                                                              
C*******************************************************************
      CALL SETSYS(0)
C*
      READ(STDIN,'(A8,1X,A8,1X,A2)') IFN,IFT,IFM
      READ(STDIN,  *  ) ADIM(1), ADIM(2), ADIM(3)
      READ(STDIN,  *  ) AUNIT(1),AUNIT(2),AUNIT(3)
      READ(STDIN,  *  ) SURFAC
C*
      READ(STDIN,'(A8,1X,A8,1X,A2)') NFN,NFT,NFM
      READ(STDIN,'(A8,1X,A8,1X,A2)') LFN,LFT,LFM
C*
      READ(STDIN,  *  ) NRES,DT
      READ(STDIN,  *  ) FCOLAP
      READ(STDIN,  *  ) VMIN,VMAX
```

```
      READ(STDIN,   *  ) DBREAK
      READ(STDIN,   *  ) MAXITR
      READ(STDIN,   *  ) OPMODE,DEBUG
C**
C*******************************************************************
C                                                               
C*******************************************************************
C**
      WRITE(STDERR,*) 'Reading image ',NCOL,NROW,NPLN
      CALL FSTATE(      IFN,IFT,IFM, RECFN, LRECL, NREC, IOS )
      IF ( IOS .EQ. 0 ) THEN
        IF ( LRECL .NE. NCOL   .OR.  NREC .NE. NROW*NPLN ) THEN
          IERROR = 29
          CALL RETSYS(1)
        ENDIF
        CALL FSOPEN( ILUN, IFN,IFT,IFM, 'F', NCOL, IOS )
        CALL FSREAD( ILUN, 1,NROW*NPLN, IMAGE, IOS )
        CALL FSCLOS( ILUN, IOS )
      ELSE
C       IERROR = 28
C       CALL RETSYS(1)
        WRITE(STDERR,*) 'Image file not found, filling with 0'
        L = NCOL*NROW*NPLN
        CALL IPFILL ( 0, IMAGE, L,1 )
      ENDIF
C*
      DO IA = 1,3
        ASIZE(IA) = ADIM(IA)*AUNIT(IA)
      ENDDO
      AR1 = ASIZE(1)*0.5
      AR2 = ASIZE(2)*0.5
      AR3 = ASIZE(3)*0.5
      RAD = SQRT(AR1*AR1 + AR2*AR2 + AR3*AR3)
C     Map diameter to +/- 1.0 in (nc)
      R = RAD
      DO IA = 1,3
        NUNIT(IA) = AUNIT(IA)/R
        NSIZE(IA) = ADIM(IA)*NUNIT(IA)
      ENDDO
      ARES = NRES*R
      WRITE(STDERR,'('' (uc) to (nc) scale: '',F12.6)') R
      WRITE(STDERR,'('' Dimension   (uc): '',3F12.6)') ASIZE
      WRITE(STDERR,'('' Dimension   (nc): '',3F12.6)') NSIZE
```

```
            WRITE(STDERR,'('' Resolution (uc): '',3F12.6)') AUNIT
            WRITE(STDERR,'('' Resolution (nc): '',3F12.6)') NUNIT
            WRITE(STDERR,'('' Step size  (uc): '', F12.6)') ARES
            WRITE(STDERR,'('' Step size  (nc): '', F12.6)') NRES
            WRITE(STDERR,'('' Half wide  (nc): '',3F12.6)')
      X            NCOL*NUNIT(1)*0.5,
      X            NROW*NUNIT(2)*0.5,
      X            NPLN*NUNIT(3)*0.5
C**
C**
            CALL FSTATE(      NFN,NFT,NFM, RECFM, LRECL, NREC, IOS )
            IF ( IOS .NE. 0 ) THEN
               IERROR = 28
               CALL RETSYS(1)
            ENDIF
            NNODE = NREC
            WRITE(STDERR,*) 'Reading nodes ',NNODE
            CALL FSOPEN( NLUN, NFN,NFT,NFM, 'F', LRECL, IOS )
            DO NODE = 0,NNODE-1
               CALL FSREAD( NLUN, NODE+1,1, PAD, IOS )
               READ(PAD,*) NSTAT(NODE),
      X                   MASS(NODE),FRICT(NODE),
      X                   (P(IA,NODE),IA=1,3),
      X                   (V(IA,NODE),IA=1,3)
CD             FRICT(NODE) = 0.0
            ENDDO
            CALL FSCLOS( NLUN, IOS )
C**
C**
            CALL FSTATE(      LFN,LFT,LFM, RECFM, LRECL, NREC, IOS )
            IF ( IOS .NE. 0 ) THEN
               IERROR = 28
               CALL RETSYS(1)
            ENDIF
            NLINK = NREC
            WRITE(STDERR,*) 'Reading links ',NLINK
            CALL FSOPEN( LLUN, LFN,LFT,LFM, 'F', LRECL, IOS )
            DO LINK = 0,NLINK-1
               CALL FSREAD( LLUN, LINK+1,1, PAD, IOS )
               READ(PAD,*) LSTAT(LINK),
      X                   SPRING(LINK),
      X                   END1(LINK),END2(LINK)
```

```
CD         SPRING(LINK) = 0.0
           ENDDO
           CALL FSCLOS( LLUN, IOS )
C**
C*******************************************************************
C**    Initialize graphics                                        **
C*******************************************************************
C**
           WRITE(STDERR,*) 'Initializing graPHIGS'
           CALL GRINIT      ! standard init
           CALL GRIV3D      ! standard 3d view setup
           DO I = 0,127
           DO J = 1,3
              CLUTS(J,I) = 0.0
           ENDDO
           ENDDO
           GRCOLR = 1
           DO J = 1,3
              CLUTS(J,GRCOLR) = 1.0
           ENDDO
           CALL GPCR(GRWSID,0,128,CLUTS)
           WRITE(STDERR,*) 'Initializing graPHIGS complete'
C*
C*******************************************************************
C                                                               
C*******************************************************************
           WRITE(STDERR,*) 'Starting iterations ',MAXITR
           CALL SWV3D(OPMODE,CLUTS,LPFK)         ! initial mesh
           NIVIEW = 1
C*
           NMOBIL = NNODE
           IF ( MAXITR .GT. 0 ) THEN
           DO ITER = 1,MAXITR
C
C          Reset node external forces
           DO NODE = 0,NNODE-1
             DO IA = 1,3
                F(IA,NODE) = 0.0
             ENDDO
           ENDDO
C
C          Apply spring forces
           DO LINK = 0,NLINK-1
```

```
         IF ( LSTAT(LINK) .EQ. LSNORM ) THEN
           NODE1 = END1(LINK)
           NODE2 = END2(LINK)
           DO IA = 1,3
             F(IA,NODE1) = F(IA,NODE1)
     X              + SPRING(LINK)*(P(IA,NODE2)-P(IA,NODE1))
           ENDDO
         ENDIF
       ENDDO
C
C      Apply dissapative force
       DO NODE = 0,NNODE-1
         DO IA = 1,3
           F(IA,NODE) = F(IA,NODE) - V(IA,NODE)*FRICT(NODE)
         ENDDO
       ENDDO
C
C      Apply collapse force
       DO NODE = 0,NNODE-1
         DO IA = 1,3
           F(IA,NODE) = F(IA,NODE) - P(IA,NODE)*FCOLAP
         ENDDO
       ENDDO
C
C      Convert inertial force to acceleration
       DO NODE = 0,NNODE-1
         DO IA = 1,3
           F(IA,NODE) = F(IA,NODE)/MASS(NODE)
         ENDDO
       ENDDO
C
C      Update node position
       DO NODE = 0,NNODE-1
         IF ( NSTAT(NODE) .EQ. NSMOVE ) THEN
C
C          Update and hard limit velocity
           DO IA = 1,3
             V(IA,NODE) = V(IA,NODE) + F(IA,NODE)*DT
             IF ( V(IA,NODE) .GT.  VMAX ) V(IA,NODE) =  VMAX
             IF ( V(IA,NODE) .LT. -VMAX ) V(IA,NODE) = -VMAX
             IF ( ABS(V(IA,NODE)) .LT. VMIN ) V(IA,NODE) = 0.0
           ENDDO
C*
```

```
C*        Check for trajectory intersection
C           Unconstrained position
          DO IA = 1,3
            PP(IA) = P(IA,NODE) + V(IA,NODE)*DT
            DP(IA) = PP(IA) - P(IA,NODE)   ! delta position (nc)
          ENDDO
          DPMAG = SQRT(DP(1)*DP(1)+DP(2)*DP(2)+DP(3)*DP(3))
          DO IA = 1,3
            DP(IA) = DP(IA)*NRES/DPMAG
          ENDDO
          IF ( DPMAG .GT. NRES ) THEN
            NRAY = DPMAG/NRES + 1
          ELSE
            NRAY = 1
          ENDIF
          IF ( DEBUG ) THEN
            WRITE(STDERR,*) 'Calling I3RAY: ',NODE
            WRITE(STDERR,*) NSIZE
            WRITE(STDERR,*) (P(IA,NODE),IA=1,3)
            WRITE(STDERR,*) PP
            WRITE(STDERR,*) DP,DPMAG
          ENDIF
          CALL I3RAYN( IMAGE, NCOL,NROW,NPLN, NUNIT,
     X                 P(1,NODE),DP,
     X                 RAY,NRAY,
     X                 I0,IX
     X               )
          IF ( DEBUG )
     X    WRITE(STDERR,*) 'Return from I3RAY: ',NRAY,I0,IX
          IF ( DEBUG )
     X    WRITE(STDERR,'(16F5.0)') (RAY(I),I=0,NRAY-1)
          I = I0
          DO WHILE ( I .LE. IX  .AND.  NSTAT(NODE) .EQ. NSMOVE )
            IF ( RAY(I) .GE. SURFAC ) THEN
              NSTAT(NODE) = NSFIXD
              NMOBIL = NMOBIL - 1
              DO IA = 1,3
                P(IA,NODE) = P(IA,NODE) + DP(IA)*I
                V(IA,NODE) = 0.0
              ENDDO
            ENDIF
            I = I + 1
          ENDDO  ! ray(i)
```

```
           IF ( NSTAT(NODE) .EQ. NSMOVE ) THEN
             DO IA = 1,3
               P(IA,NODE) = PP(IA)
             ENDDO
           ENDIF
C
         ENDIF  ! static
CD       WRITE(STDERR,*) 'End of update on node ',NODE
       ENDDO  ! node update
C
C      Check for broken springs
       DO LINK = 0,NLINK-1
       IF ( LSTAT(LINK) .EQ. LSNORM ) THEN
         NODE1 = END1(LINK)
         NODE2 = END2(LINK)
         DNODE = 0.0
         DO IA = 1,3
           DPI = P(IA,NODE2)-P(IA,NODE1)
           DNODE = DNODE + DPI*DPI
         ENDDO
         IF ( DNODE .GT. DBREAK*DBREAK ) THEN
           LSTAT(LINK) = LSBROK
         ENDIF
       ENDIF  ! lsnorm
       ENDDO  ! links
C
C      Compute potential energy
       PE = 0.0
       DO LINK = 0,NLINK-1

NODE1 = END1(LINK)
         NODE2 = END2(LINK)
         DO IA = 1,3
           DPI = P(IA,NODE2)-P(IA,NODE1)
           PE = PE + SPRING(LINK)*DPI*DPI
         ENDDO
       ENDDO
       PE = 0.25*PE/MAX0(NMOBIL,1)
C
C      Compute kenetic energy
       KE = 0.0
       DO NODE = 0,NNODE-1
         DO IA = 1,3
           KE = KE + V(IA,NODE)*V(IA,NODE)*MASS(NODE)
         ENDDO
```

```fortran
      ENDDO
C
C     Compute average radius
      AR = 0.0
      DO NODE = 0,NNODE-1
        DO IA = 1,3
          AR = AR + P(IA,NODE)*P(IA,NODE)
        ENDDO
      ENDDO
      AR = SQRT(AR/NNODE)
C*
      E = KE + PE
      WRITE(STDOUT,'(1X,I5,1X,I8,5F14.6)') ITER,NMOBIL,
     X            KE,PE,E,AR
C*
      NIVIEW = NIVIEW - 1
      IF ( NIVIEW .LE. 0 ) THEN
        CALL SWV3D(OPMODE,CLUTS,LPFK)
        IF ( LPFK .EQ. 32 ) THEN
          WRITE(STDERR,*) 'Enter number of interations: '
          READ(STDERR,*) NIVIEW
          IF ( NIVIEW .LE. 0 ) GOTO 10000
        ELSE
          NIVIEW = 1
        ENDIF
      ELSE
        CALL SWV3D(0,CLUTS,LPFK)
      ENDIF
C*
      ENDDO   ! iter
      ENDIF   ! maxiter > 0
10000 CONTINUE
C**
C*******************************************************************
                                                                  **
C**
C*******************************************************************
C**
      WRITE(STDPRT,*)
      DO NODE = 0,NNODE-1
        WRITE(STDPRT,'(I2,1X,F6.4,1X,F6.4,9(1X,F9.6))')
     X              NSTAT(NODE),MASS(NODE),FRICT(NODE),
     X              (P(IA,NODE),IA=1,3),(V(IA,NODE),IA=1,3)
C    X              ,(F(IA,NODE),IA=1,3)
      ENDDO
```

```
C**
C      WRITE(STDPRT,*)
C      DO LINK = 0,NLINK-1
C         WRITE(STDPRT,'(I2,1X,F6.4,1X,I9,1X,I9)')
C    X                 LSTAT(LINK),SPRING(LINK),
C    X                 END1(LINK),END2(LINK)
C      ENDDO
C**
C***************************************************************
C**                                                           **
C***************************************************************
       CALL GRWRAP
       CALL RETSYS(0)
       END
C**
C***************************************************************
C**                                                           **
C***************************************************************
@PROCESS DIRECTIVE('*VDIR:') DC(CNODES,CLINKS,CIMAGE)
       SUBROUTINE SWV3D(OPMODE,CLUTS,LPFK)
       INTEGER*4  OPMODE,LPFK
       REAL*4     CLUTS(3,0:1)
       &INCLUDE SYSTEM/SYSTEM
       &INCLUDE GRPHIGS/GRPHIGS
C*
       PARAMETER ( NSMOVE = 0 )  ! NSTAT: node mobile
       PARAMETER ( NSFIXD = 1 )  !        node fixed to surface
       PARAMETER ( LNODE = 65536 )
       COMMON /CNODES/ NNODE,NSTAT,
     X                 MASS,FRICT,
     X                 P,V,F
       INTEGER*4 NSTAT(0:LNODE)
       REAL*4    MASS(0:LNODE)
       REAL*4    FRICT(0:LNODE)
       REAL*4    P(3,0:LNODE),V(3,0:LNODE),F(3,0:LNODE)
C*
       PARAMETER ( LSNORM = 0 )  ! LSTAT: normal
       PARAMETER ( LSBROK = 1 )  !        broken
       PARAMETER ( LLINK = 16*LNODE )
       COMMON /CLINKS/ NLINK,LSTAT,SPRING,
     X                 END1,END2
```

```fortran
      INTEGER*4 LSTAT(0:LLINK)
      REAL*4    SPRING(0:LLINK)
      INTEGER*4 END1(0:LLINK),END2(0:LLINK)
C**
C**
      GRSTRN = 1
      CALL GPEST(GRSTRN)
      CALL GPOPST(GRSTRN)
      CALL GPLT(1.0)
      CALL GPLWSC(1.0)
      CALL GPPLCI(GRCOLR)
C*
      GRPCNT = 0
      DO LINK = 0,NLINK-1
      IF ( LSTAT(LINK) .EQ. LSNORM ) THEN
        NODE1 = END1(LINK)
        NODE2 = END2(LINK)
        GRPCNT = GRPCNT + 1
        GRPPEN(GRPCNT  ) = 1
        GRPPEN(GRPCNT+1) = 2
        DO IA = 1,3
          GRP3S(IA,GRPCNT  ) = P(IA,NODE1)
          GRP3S(IA,GRPCNT+1) = P(IA,NODE2)
        ENDDO
        GRPCNT = GRPCNT + 1
        IF ( GRPCNT .GE. $GRPNT-1 ) THEN
CD        WRITE(*,*) 'Drawing ',GRPCNT
          CALL GPDPL3(GRPCNT,3,GRP3S,GRPPEN(2))
          GRPCNT = 0
        ENDIF
      ENDIF ! normal links
      ENDDO ! links
C*
      IF ( GRPCNT .GT. 1 ) THEN
CD      WRITE(*,*) 'Drawing ',GRPCNT
        CALL GPDPL3(GRPCNT,3,GRP3S,GRPPEN(2))
      ENDIF
C*
      CALL GPCLST
      CALL GPARV(GRWSID, GRVIEW, GRSTRN, 1.0)
      CALL GPUPWS(GRWSID,2)
```

```
C*
      IF ( OPMODE .NE. 0 ) THEN
         CALL GRGV3D(OPMODE,CLUTS,LPFK)
      ELSE
         LPFK = 4
      ENDIF
C*
      RETURN
      END
```

Having thus described our invention, what we claim as new, and desire to secure by Letters Patent is:

1. Apparatus for generating a wire-mesh representation of image information representative of a three dimensional surface, comprising:
   (a) processor means for reading image information representative of a three dimensional surface into a memory means;
   (b) processor means for generating a wire-mesh representing a three dimensional spherical or cylindrical surface in the memory means which envelopes the image information from the reading means and includes a plurality of movable points separated by uniform angular increments as viewed from an origin point;
   (c) processor means for collapsing the movable wire-mesh points a selected increment toward the image information representative of a three dimensional surface;
   (d) processor means for determining intersecting points between the wire-mesh and the image information representative of a three dimensional surface;
   (d) processor means for clamping the intersecting points to the image information representative of a three dimensional surface so that the intersecting points are not movable; and
   (f) processor means for repeatedly activating means (c), (d) and (e) sequentially until every point of the wire-mesh is clamped to form a wire-mesh representation of the three dimensional surface.

2. A computer implemented method for generating a wire-mesh representation of image information representative of a three dimensional surface, comprising the steps of:
   (a) reading image information representative of a three dimensional surface into a memory means;
   (b) generating a wire-mesh representing a three dimensional spherical or cylindrical surface in the memory means which envelopes the image information and includes a plurality of movable points separated by uniform angular increments as viewed from an origin point;
   (c) collapsing the movable wire-mesh points a selected increment toward the image information representative of a three dimensional surface;
   (d) determining intersecting points between the wire-mesh and the image information representative of a three dimensional surface;
   (e) clamping the intersecting points to the image information representative of a three dimensional surface so that the intersecting points are not movable; and
   (f) repeating steps (c), (d) and (e) until every point of the wire-mesh is clamped to form a wire-mesh representation of the three dimensional surface.

3. A method of using a computer, having a processor and a memory, to generate a wire-mesh data set representing image data in the memory for a three-dimensional object, comprising the steps of:
   selecting, using the processor, an initial wire-mesh data set having a set of points and links between pairs of points which describe a three-dimensional space which encloses the image data;
   assigning, using the processor, a simulated physical property to each of the points and the links so that the wire-mesh simulates an elastic membrane with an elastic force acting on each point; and
   simulating, using the processor, by moving the points, a collapsing movement of the elastic membrane acting in response to a driving force directed toward the image data and a dissipative force resisting the driving and elastic forces until each point is either located at a surfacepoint of the image data or the driving force and the elastic force acting on a point are essentially in equilibrium.

4. The method of claim 3, further comprising the step of storing, using the processor, the points and links, in a nonvolatile storage, as a wire-mesh data set representative of the image data.

5. The method of claim 3, the assigning step further comprising the step of giving, using the processor, each point a mass value representative of the mass of the elastic membrane and each link between the points a spring strength value representative of a simulated spring as the elastic member connected between each pair of linked points.

6. The method of claim 5, the simulating step further comprising moving, using the processor, each point by applying Newton's laws for forces acting on masses to the driving force acting on the mass value for each point and Hooke's law to the spring strength value and a distance between each pair of points to find the elastic force.

7. The method of claim 6, wherein the dissipative force is directly proportional to a velocity value for each point.

8. A method of using a computer having a processor to generate a wire mesh data set representing image data for a three-dimensional object, comprising the steps of:

selecting, using the processor, an initial wire mesh data set having a set of points and links between pairs of points which describe a three-dimensional space which encloses the image data;

tagging, using the processor, each of the points as non-fixed;

assigning, using the processor, a simulated physical property to each of the points and the links so that the wire mesh simulates an elastic membrane;

moving, using the processor, each of the points tagged as non-fixed, an increment corresponding to an application for a selected time (t) of a simulated driving force, directed toward the image data, acting on the simulated physical properties for the points and the links, the point and a simulated dissipative force resisting the simulated driving force which together impart a simulated velocity to each of the points and simulates the constriction of an elastic membrane around the image data;

testing, using the processor, each point, tagged as non-fixed, to determine if a surface contact has occurred by the point being at a surface position or moving across a surface position represented in the image data, and if a surface contact has occurred, then setting the position of that point equal to the surface position and tagging that point as fixed;

determining, using the processor, a total kinetic energy value which is obtained by adding together a simulated kinetic energy of all points; and repeating the moving, testing and comparing steps if the total kinetic energy exceeds a threshold value.

9. The method of claim 8, further comprising the step of storing, using the processor, the wire-mesh data set in a nonvolatile storage.

10. The method of claim 8, the assigning step further comprising the step of giving, using the processor, each point a mass value representative of the mass of the elastic membrane and each link between the points a spring strength value representative of a simulated spring as the elastic member connected between each pair of linked points.

11. The method of claim 10, the simulating step further comprising moving, using the processor, each point by applying Newton's laws for forces acting on masses to the driving force acting on the mass value for each point and Hooke's law to the spring strength value and a distance between each pair of points to find an elastic force.

12. The method of claim 10, wherein the dissipative force is directly proportional to a velocity value for each point.

13. An apparatus, having a processor and a memory, for generating a wire mesh data set representing image data in the memory for a three-dimensional object, comprising:

means for selecting, using the processor, an initial wire mesh data set having a set of points and links between pairs of points which describe a three-dimensional space which encloses the image data;

means for assigning, using the processor, a simulated physical property to each of the points and the links so that the wire mesh simulates an elastic membrane with an elastic force acting on each point;

means for simulating, using the processor, by moving the points, a collapsing movement of the elastic membrane acting in response to a driving force directed toward the image data and a dissipative force resisting the driving and elastic forces until each point is either located at a surface point of the image data or the driving force and the elastic force acting on a point are essentially in equilibrium; and means for storing, using the processor, the points and links, on a disk, as a wire mesh data set representative of the image data.

14. The apparatus of claim 13, the means for assigning further comprising means for giving, using the processor, each point a mass value representative of the mass of the elastic membrane and each link between the points a spring strength value representative of a simulated spring as the elastic member connected between each pair of linked points.

15. The apparatus of claim 14, the means for simulating further comprising means for moving, using the processor, each point by applying Newton's laws for forces acting on masses to the driving force acting on the mass value for each point and Hooke's law to the spring strength value and the distance between each pair of points to find the elastic force.

16. The apparatus of claim 15, wherein the dissipative force is directly proportional to a velocity value for each point.

* * * * *

UNITED STATES PATENT AND TRADEMARK OFFICE
CERTIFICATE OF CORRECTION

PATENT NO. : 5,257,346
DATED : October 26, 1993
INVENTOR(S) : William A. Hanson

It is certified that error appears in the above-indentified patent and that said Letters Patent is hereby corrected as shown below:

Column 6, line 35, delete "$i_jє T^i$", insert -- $\forall i \forall j є T^i$ --.

Column 29, line 42, delete "(d)", insert -- (e) --.

Signed and Sealed this

Thirtieth Day of August, 1994

Attest:

BRUCE LEHMAN

*Attesting Officer*    *Commissioner of Patents and Trademarks*